United States Patent [19]

Kato et al.

[11] Patent Number: 5,014,929
[45] Date of Patent: May 14, 1991

[54] FILM STRIP FEEDING APPARATUS

[75] Inventors: Osami Kato; Tsutomu Tsukamoto; Takanori Saitoh, all of Osaka, Japan

[73] Assignee: Minolta Camera Co., Ltd., Osaka, Japan

[21] Appl. No.: 303,697

[22] Filed: Jan. 27, 1989

[30] Foreign Application Priority Data

Jan. 29, 1988 [JP] Japan .................................. 63-20271
Jan. 29, 1988 [JP] Japan .................................. 63-20272
Feb. 25, 1988 [JP] Japan .................................. 63-44715
Dec. 19, 1988 [JP] Japan .................................. 63-321678

[51] Int. Cl.$^5$ .................... G03B 1/06; G03B 23/02; G11B 23/08
[52] U.S. Cl. ............................... 242/195; 242/192; 242/197; 352/72
[58] Field of Search ................ 242/192, 195, 197, 76, 242/55, 179; 352/72

[56] References Cited

U.S. PATENT DOCUMENTS

| | | | |
|---|---|---|---|
| 1,953,985 | 4/1934 | Kindelmann et al. | 242/76 |
| 2,554,175 | 5/1951 | Duncan | 242/55.2 |
| 3,558,028 | 1/1971 | Bunting | 226/91 |
| 3,691,921 | 9/1972 | Isbell | 242/197 X |
| 3,731,891 | 5/1973 | Stark | 242/195 |
| 3,819,129 | 6/1974 | Theuenaz et al. | 242/195 X |
| 3,870,246 | 3/1975 | Yamada et al. | 242/192 |
| 3,991,955 | 11/1976 | Crayton et al. | 242/192 |
| 4,059,211 | 11/1977 | Brizzolara | 242/195 X |
| 4,196,873 | 4/1980 | Kudoh | 242/195 |
| 4,408,732 | 10/1983 | Toriumi et al. | 242/192 |
| 4,453,682 | 6/1984 | Ishir et al. | 242/192 |
| 4,826,102 | 5/1989 | Kato et al. | 242/192 |

FOREIGN PATENT DOCUMENTS 61-135 1/1986 Japan .

Primary Examiner—Daniel P. Stodola
Assistant Examiner—Paul Thomas Bowen
Attorney, Agent, or Firm—Willian Brinks Olds Hofer Gilson & Lione

[57] ABSTRACT

A film strip feeding apparatus for use with a film storage device detachably assembled into the apparatus and having an inner peripheral surface portion defining a circular central opening merging with a film outlet/inlet opening and having a roll of a film strip rotatably stored in the central opening, wherein a rockable member is provided which has carried thereon a stripping roller engageable with the roll of film in the film storage device and operative to unwind and strip a leading end portion of the film strip from the roll of film and feeding the leading end portion of the film strip out of the film storage device through the film outlet/inlet opening, the rockable member being rockable between a first angular position having the stripping roller disengaged from the roll of film and a second angular position having the stripping roller held in rollable engagement with the roll of film. A guide member is further provided which is engaged by the film storage device assembled into the apparatus and having a surface portion to guide the leading end portion of the film strip being unwound and stripped from the roll of film, the guide member providing discharging means for contacting the leading end portion of the film strip being unwound and stripped from the roll of film and thereby removing electrostatic charges which may have been generated on the leading end portion of the film strip.

9 Claims, 11 Drawing Sheets

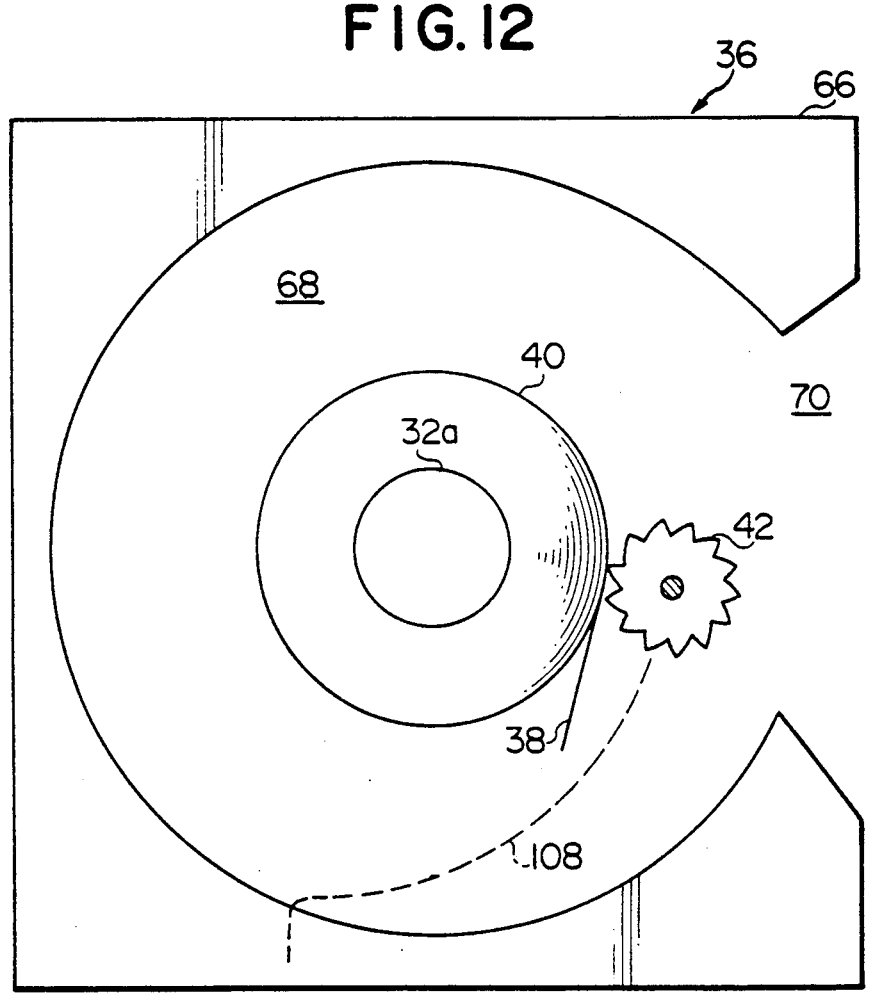

A known film strip feeding apparatus of this type generally has a drawback in that electrostatic charges are generated on the leading end portion of the microfilm strip and the inner peripheral surface of the film storage cartridge due to the sliding friction caused therebetween while the leading end portion of the microfilm strip is being withdrawn from the film storage cartridge. The electrostatic charges thus generated on the leading end portion of the microfilm strip tend to hinder the microfilm strip from being smoothly allowed out of the film storage cartridge. Some attempts have thus far been made with a view to overcoming such a problem.

FIGS. 1 and 2 of the drawings show an example of a prior-art rolled film storage cartridge incorporating one of such attempts. The rolled film storage cartridge herein shown is taught in Japanese Provisional Utility Model Publication (Kokai) 61-135.

As shown, the prior-art rolled film storage cartridge has a casing 20 formed with a generally circular central opening 22 merging with a film outlet/inlet opening 24 which is open through a side portion of the casing 20. The circular central opening 22 is defined by a guide portion 26 provided by an inner peripheral wall portion of the casing 20. Within the circular central opening 22 in the casing 20 is assembled a film-carrying reel 28 having a pair of spaced parallel flange portions indicated by phantom lines in FIG. 2. Though not shown, the film-carrying reel 28 has a continuous length of microfilm strip wound in roll form and is rotatable within the central opening 22 about an axis coincident with the center axis of the central opening 22. During use of the film storage cartridge thus constructed, a leading end portion of the microfilm strip carried on the reel 28 is unwound from the roll of film with the reel 28 driven for rotation within the central opening 22 and is withdrawn from the cartridge through the film outlet/inlet opening 24 in the casing 20.

To the inner peripheral surface of the guide portion 26 of the casing 20 is attached a discharging brush 30 composed of a number of wire elements extending radially inwardly from the inner peripheral surface of the guide portion 26. While the microfilm strip is being unwound from the roll of film and withdrawn from the cartridge through the film outlet/inlet opening 24 in the casing 20, the outermost layer of the roll of film rotating with the film-carrying reel 28 within the circular central opening 22 is held in sliding contact with the discharging brush 30. The electrostatic charges which may have generated on the microfilm strip can thus be removed from the microfilm strip until the microfilm strip is withdrawn through the film outlet/inlet opening 24 in the casing 20.

The prior-art rolled film storage cartridge provided with the discharging brush 30 is thus useful for removing from the microfilm strip the electrostatic charges which may otherwise hinder the microfilm strip from being smoothly allowed out of the cartridge; however, there are still some problems inherent in a film storage cartridge of the described nature. Where an extremely thin microfilm strip having a small stiffness in the longitudinal direction of the microfilm strip is to be used in the cartridge, the microfilm strip tends to be bent while being fed out of the cartridge. Where, furthermore, the roll of film stored in the cartridge has a relatively small diameter, the leading end portion of the microfilm strip must be unwound by a larger length from the roll of the film and thus also tends to be bent while the microfilm strip is being fed out of the cartridge. If the leading end portion of the microfilm strip being unwound from the roll of film is curled in a direction opposite to the direction of travel of the microfilm strip through the film outlet/inlet opening 24 or is deviated from the straight direction in which the microfilm strip should travel through the film outlet/inlet opening 24, the leading end portion of the microfilm strip may happen to be hitched on the discharging brush 30 and may thus be hindered from being withdrawn smoothly out of the cartridge. There is a further problem in that the provision of the discharging brush 30 adds to the production cost of the cartridge as a whole.

SUMMARY OF THE INVENTION

The present invention contemplates provision of solutions to these problems inherent in a film strip feeding apparatus using a known type of rolled film storage cartridge.

In accordance with one outstanding aspect of the present invention, there is provided a film strip feeding apparatus for use with a film storage device detachably assembled into the film strip feeding apparatus and having an inner peripheral surface portion defining a generally circular central opening merging with a film outlet/inlet opening and having a roll of a film strip rotatably stored in the central opening, comprising (a) stripping means for unwinding and stripping a leading end portion of the film strip from the roll of film and feeding the leading end portion of the film strip out of the film storage device through the film outlet/inlet opening, (b) a guide member engaged by the film storage device assembled into the film strip feeding apparatus and having a surface portion to guide the leading end portion of the film strip being unwound and stripped from the roll of film, and (c) discharging means formed on the surface portion of the guide member for contacting the leading end portion of the film strip being unwound and stripped from the roll of film and thereby removing electrostatic charges which may have been generated on the leading end portion of the film strip.

In accordance with another outstanding aspect of the present invention, there is provided a film strip feeding apparatus for use with a film storage device detachably assembled into the film strip feeding apparatus and having an inner peripheral surface portion defining a generally circular central opening merging with a film outlet/inlet opening and having a roll of a film strip rotatably stored in the central opening, comprising (a) stripping means for unwinding and stripping a leading end portion of the film strip from the roll of film and feeding the leading end portion of the film strip out of the film storage device through the film outlet/inlet opening, and (b) a guide member engaged by the film storage device assembled into the film strip feeding apparatus and having a surface portion to guide the leading end portion of the film strip being unwound and stripped from the roll of film, the guide member comprising an electrically conductive member fast on the surface portion of the guide member and connected to ground for contacting the leading end portion of the film strip being unwound and stripped from the roll of film and thereby removing electrostatic charges which may have been generated on the leading end portion of the film strip.

In accordance with still another outstanding aspect of the present invention, there is provided a film strip feeding apparatus for use with a film storage device detachably assembled into the film strip feeding apparatus and having an inner peripheral surface portion defining a generally circular central opening merging with a film outlet/inlet opening and having a roll of a film strip rotatably stored in the central opening, comprising (a) stripping means for unwinding and stripping a leading end portion of the film strip from the roll of film and feeding the leading end portion of the film strip out of the film storage device through the film outlet/inlet opening, (b) a guide member engaged by the film storage device assembled into the film strip feeding apparatus and having a surface portion to guide the leading end portion of the film strip being unwound and stripped from the roll of film, and (c) means for moving the surface portion of the guide member radially toward or away from the outer peripheral surface of the roll of film depending on the diameter of the roll of film.

In accordance with still another outstanding aspect of the present invention, there is provided a film strip feeding apparatus for use with a film storage device detachably assembled into the film strip feeding apparatus and having an inner peripheral surface portion defining a generally circular central opening merging with a film outlet/inlet opening and having a roll of a film strip rotatably stored in the central opening, comprising (a) a rockable member carrying a stripping roller engageable with the roll of film in the film storage device and operative to unwind and strip a leading end portion of the film strip from the roll of film and feeding the leading end portion of the film strip out of the film storage device through the film outlet/inlet opening, the rockable member being rockable about an axis fixed in the film strip feeding apparatus between a first angular position having the stripping roller disengaged from the roll of film and a second angular position having the stripping roller held in rollable engagement with the roll of film, (b) a guide member engaged by the film storage device assembled into the film strip feeding apparatus and having a surface portion to guide the leading end portion of the film strip being unwound and stripped from the roll of film, and (c) discharging means formed on the surface portion of the guide member for contacting the leading end portion of the film strip being unwound and stripped from the roll of film and thereby removing electrostatic charges which may have been generated on the leading end portion of the film strip.

BRIEF DESCRIPTION OF THE DRAWINGS

The features and advantages of a film strip feeding apparatus according to the present invention will be more clearly appreciated from the following description taken in conjunction with the accompanying drawings in which like reference numerals designate similar or corresponding units, members and elements and in which:

FIG. 12 is a schematic view showing the arrangement in which a film guide member also included in the embodiment illustrated in FIGS. 9 and 10 is moved inwardly in the cartridge.

DESCRIPTION OF THE PREFERRED EMBODIMENTS

Some preferred embodiments of a film strip feeding apparatus according to the present invention will be hereinafter described with reference to the drawings.

Figure 1:
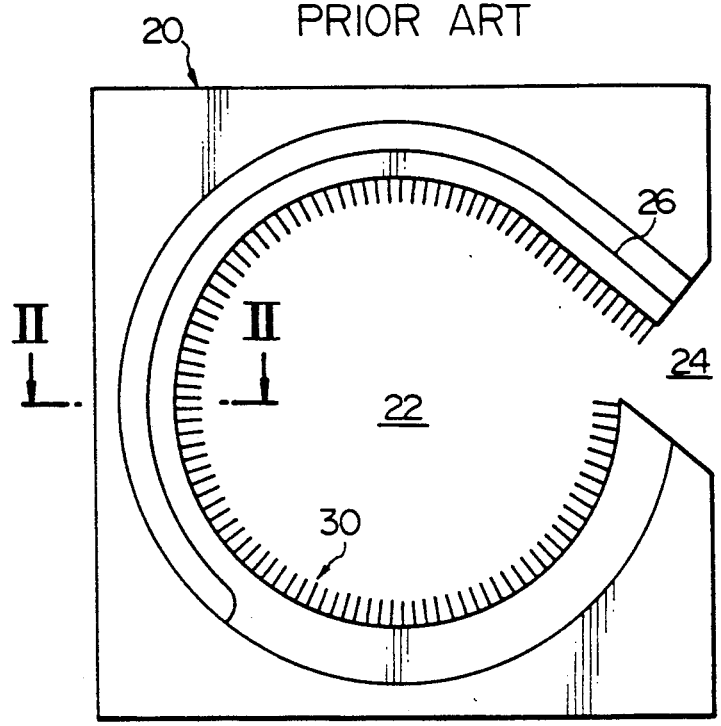
FIG. 1 is a plan view showing an example of a prior-art rolled film storage cartridge for use in a microfilm reader.
Figure 2:
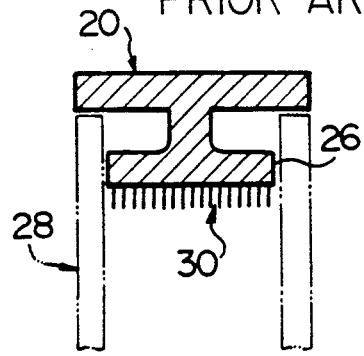
FIG. 2 is a sectional view taken along line II—II in FIG. 1.
Figure 3:
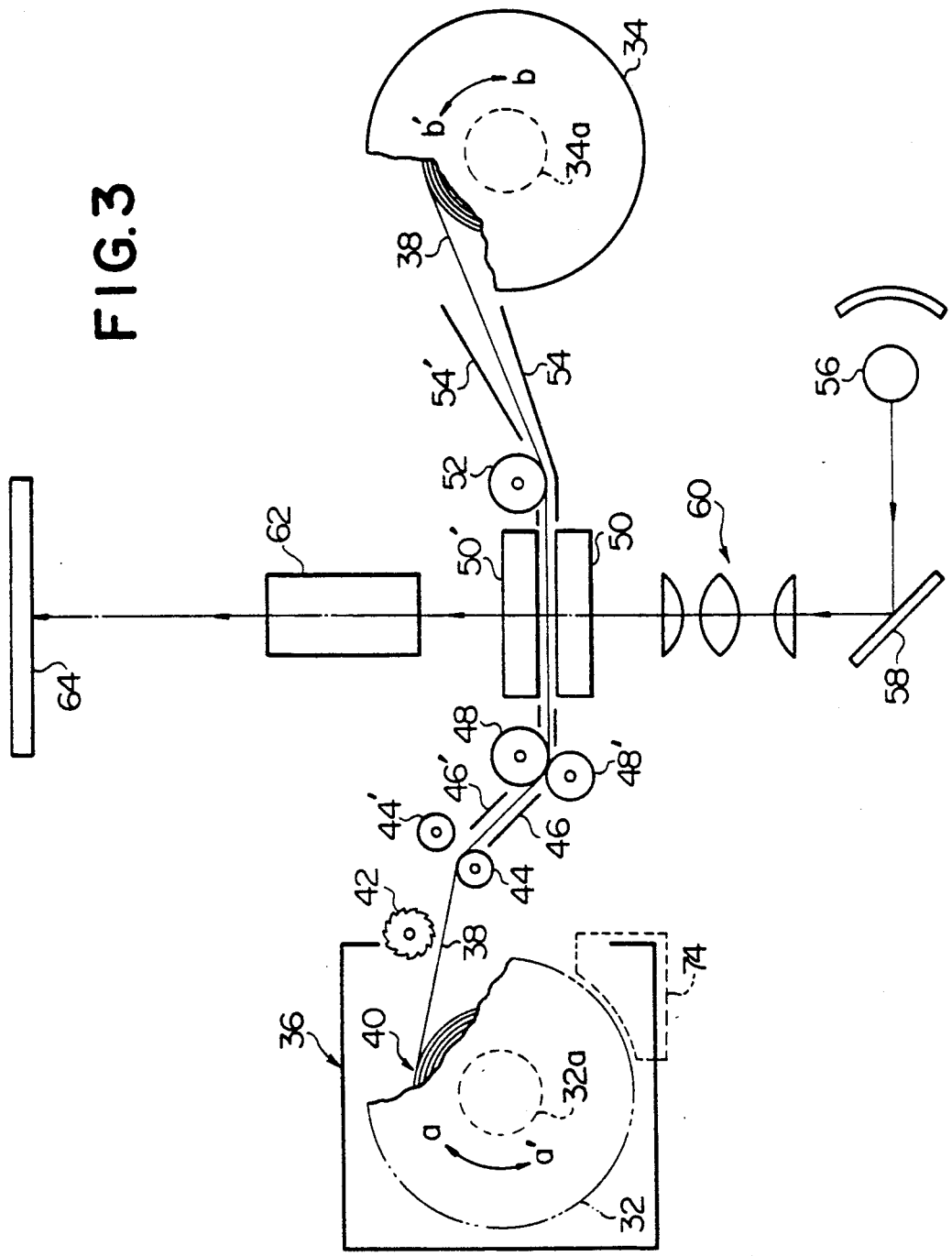
FIG. 3 is a schematic view showing the general construction and arrangement of a microfilm reader into which a film strip feeding apparatus embodying the present invention may be incorporated by preference.

FIG. 3 shows the general mechanical and optical construction and arrangement of a microfilm reader into which each of the preferred embodiments of the present invention may be incorporated by preference.

The microfilm reader herein shown comprises first and second film-carrying reels 32 and 34. The first film-carrying reel 32 is encased in a rolled film storage cartridge 36 and is herein assumed to act as a feed reel having a continuous length of microfilm strip 38 wound in the form of a roll 40. The second film-carrying reel 34 is spaced apart from the feed reel 32 and is assumed to act as a take-up reel to take up the microfilm strip 38 unwound from the roll of film 40 on the feed reel 32. The film storage cartridge 36 is detachably assembled into the microfilm reader so that any desired microfilm strip may be loaded into the microfilm reader through exchange of the cartridge 36 with another one.

The leading end portion of the microfilm strip 38 unwound from the roll of film 40 on the feed reel 32 is separated from the roll of film 40 by means of a stripping roller 42 which is located in proximity to a film outlet/inlet opening of the cartridge 36. The microfilm strip 38 is then fed toward the take-up reel 34 by way of a combination of a feed roller 44 and an associated roller 44', a pair of spaced guide plates 46 and 46', a combination of an encoder roller 48 and an associated roller 48', a pair of transparent film holder plates 50 and 50', a guide roller 52, and a pair of spaced guide plates 54 and 54'. The stripping roller 42 is arranged to be movable into or out of the film outlet/inlet opening of the cartridge 36 and the feed roller 44 is coupled to suitable drive means (not shown) adapted to drive the roller 44 for rotation in either direction about the center axis thereof, as will be described later.

The feed reel 32 and take-up reel 34 are engaged by drive shafts 32a and 34a, respectively, which form part of the microfilm reader. These drive shafts 32a and 34a of the feed and take-up reels 32 and 34 are coupled to suitable drive means such as a pulsating motor (not shown) and are to be concurrently driven for rotation in either direction. When the feed reel 32 and take-up reel 34 is driven for rotation in the directions of arrows a and b, respectively, the microfilm strip 38 is unwound from the feed reel 32 and is fed to the take-up reel 34. With the feed reel 32 and take-up reel 34 driven for rotation in the directions of arrows a' and b', respectively, the microfilm strip 38 is unwound from the take-up reel 34 and is rewound on the feed reel 32. The microfilm strip 38 has carried thereon a series of image frames and is driven to travel to have one of the image frames located between the transparent film holder plates 50 and 50'. The film holder plates 50 and 50' are positioned to define in the microfilm reader an image pick-up area in which any one of the image frames of the microfilm strip 38 is to be picked up.

On one side of the image pick-up area thus defined by the film holder plates 50 and 50' is positioned a source of light including a lamp 56 from which a beam of light is emitted toward a reflector mirror 58. The light reflected from the mirror 58 is directed to the film holder plates 50 and 50' through a series of condenser lenses 60 and is passed through the microfilm strip 38 intervening between the transparent film holder plates 50 and 50'. The light passed through the film holder plates 50 and 50' and microfilm strip 38 is admitted into a cylindrical projection lens 62 and is thereby projected onto a viewing screen 64. On the viewing screen 64 is thus reproduced an enlarged version of the image picked up from the image frame of the microfilm strip 38 located in the image pick-up area defined by the film holder plates 50 and 50'.

The mechanical and optical construction and arrangement of the microfilm reader as hereinbefore described and shown in FIG. 3 is simply by way of example and may be modified in numerous manners or may be substituted by any other form of microfilm reader arrangement.

Figure 4:
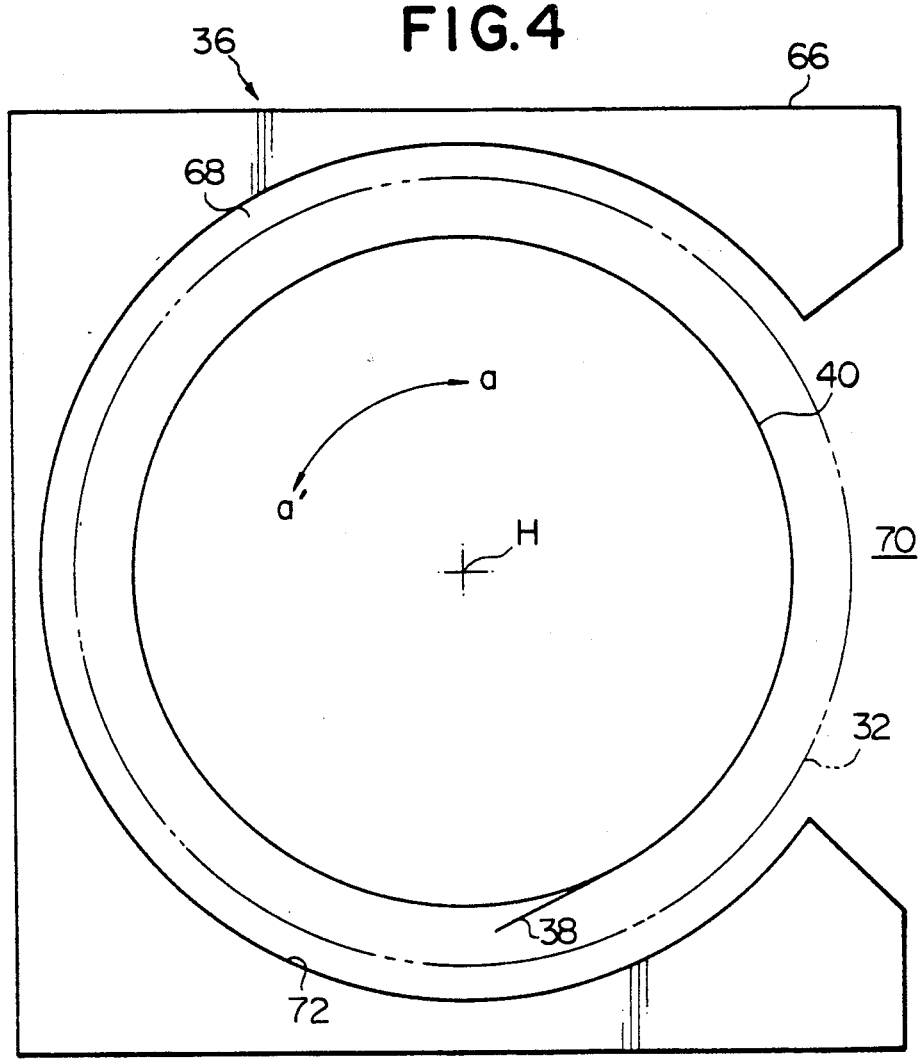
FIG. 4 is a plan view showing, to an enlarged scale, the general configuration of a rolled film storage cartridge for use in a film strip feeding apparatus embodying the present invention.

FIG. 4 shows the general configuration of the rolled film storage cartridge 36 for use in a film strip feeding apparatus embodying the present invention. As shown, the film storage cartridge 36 comprises a casing 66 formed with a generally circular central opening 68 merging with a film outlet/inlet opening 70 which is open through a side portion of the casing 66. The circular central opening 68 is defined by a guide portion 72 provided by an inner peripheral wall portion of the casing 66. Within the circular central opening 68 in the casing 66 is assembled the feed reel 32 rotatable within the opening 22 in the direction of arrow a or a' about an axis H coincident with the center axis of the central opening 68.

Figure 5:
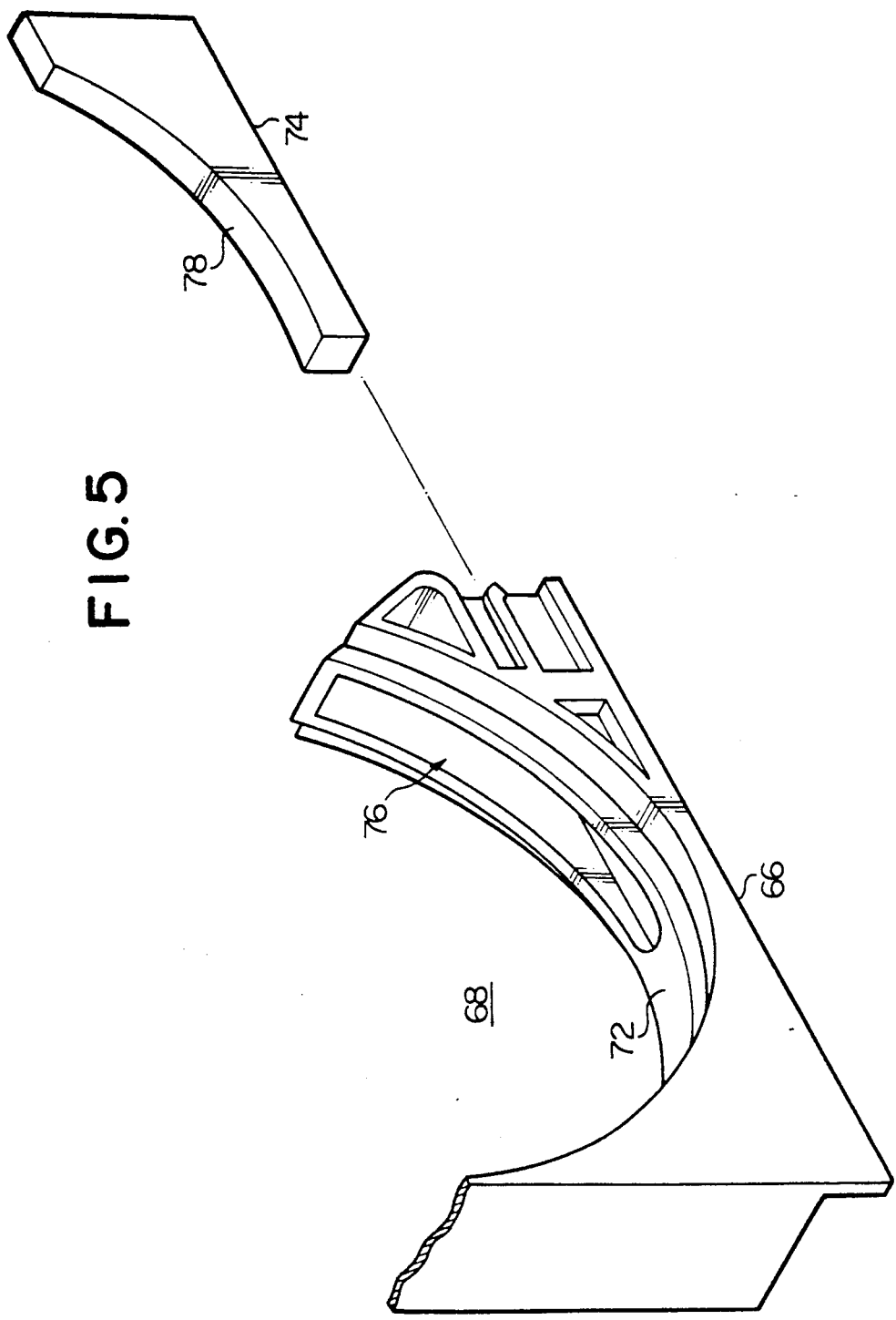
FIG. 5 is a fragmentary perspective view showing a portion of a rolled film storage cartridge for use particularly in a first preferred embodiment of a film strip feeding apparatus according to the present invention and a film guide member which forms part of the film strip feeding apparatus.

FIG. 5 is a fragmentary perspective view showing a portion of the rolled film storage cartridge 36 for use particularly in a first preferred embodiment of a film strip feeding apparatus according to the present invention. In FIG. 5 is further illustrated a film guide member 74 which forms part of the film strip feeding apparatus and which is indicated by broken lines in FIG. 3.

As shown in FIG. 5, the casing 66 of the rolled film storage cartridge 36 for use in the first preferred embodiment of a film strip feeding apparatus according to the present invention has a slot 76 which is open to the circular central opening 68 in the casing 66. The slot 76 is further open through the side portion of the casing 66 in which the film outlet/inlet opening 70 is formed. Through the slot 76 thus formed in the casing 66, the circular central opening 68 in the casing 66 is open externally of the side portion of the casing 66 in which the film outlet/inlet opening 70 is formed. The film guide member 74 forming part of the film strip feeding apparatus is shaped conformingly to the slot 76 in the film storage cartridge 36 and has an arcuately curved inner surface portion 78 having a radius of curvature identical with that of the inner peripheral wall portion of the casing 66 forming the guide portion 72 of the cartridge 36. The film guide member 74 is herein assumed to be in its entirety made of metal but, if desired, may be coated or covered with a film of metal forming the curved inner surface portion 78. The conductive curved inner surface portion 78 of such a film guide member 74 is grounded through a suitable conductor, though not shown in the drawings.

When the film storage cartridge 36 is assembled into the microfilm reader and is installed in a predetermined position within the microfilm reader, the film guide member 74 is received in the slot 76 in the cartridge 36. With the film guide member 74 thus received in the slot 76 in the cartridge 36, the guide member 74 has its conductive curved inner surface portion 78 located to be continuous to the guide portion 72 provided by an inner peripheral wall portion of the casing 66. The film-carrying reel 32 encased in the cartridge 36 is rotatably held in position in part by the inner peripheral surface of the guide portion 72 of the casing 66 and in part by the curved inner surface portion 78 of the film guide member 74.

The film guide member 74 forms part of the film strip feeding apparatus embodying the present invention. The film strip feeding apparatus embodying the present invention is assumed to form part of the microfilm reader constructed and arranged as hereinbefore described with reference to FIG. 3 and is used to feed a leading end portion of the microfilm strip 38 out of the film storage cartridge 36.

Figure 6:
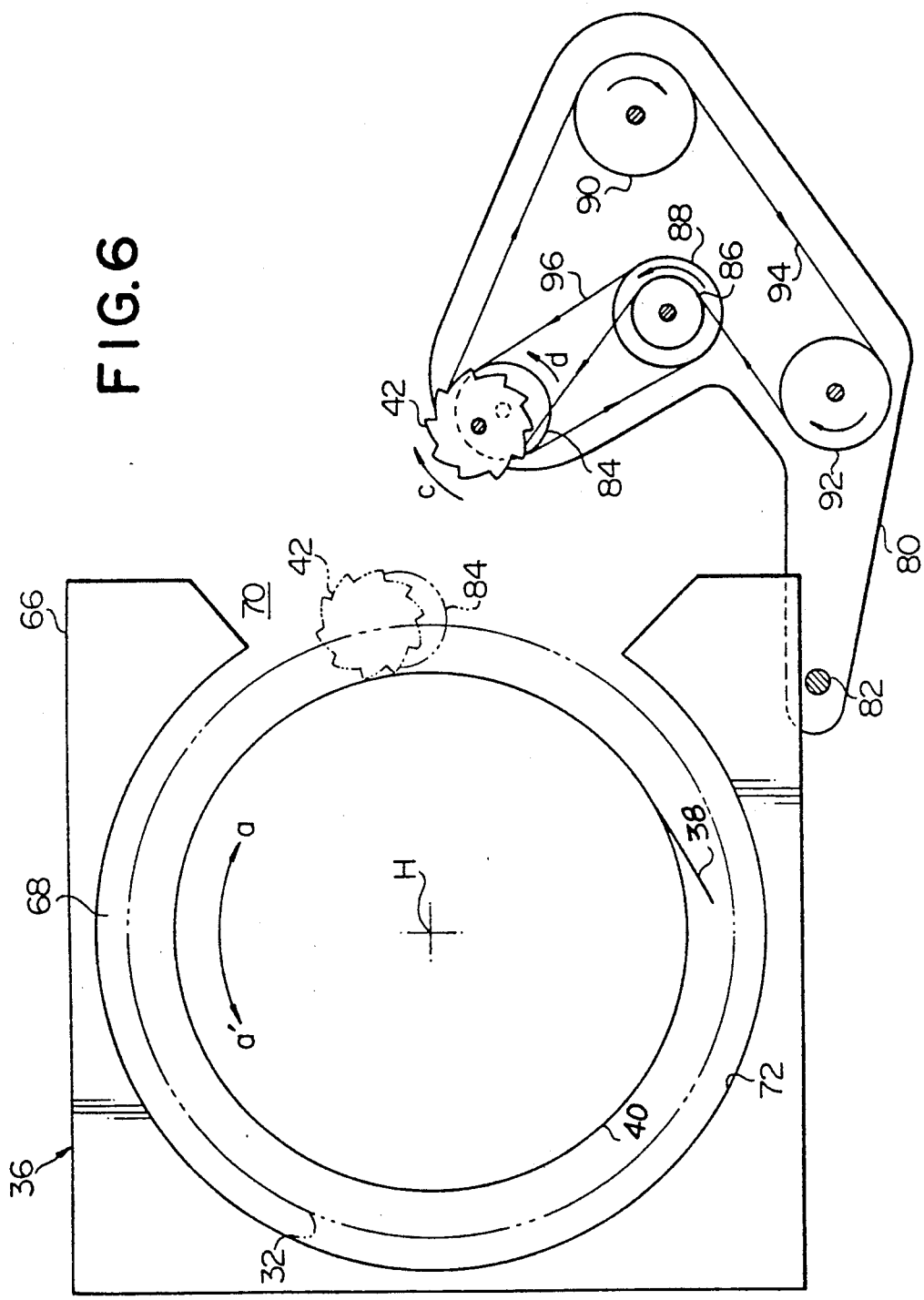
FIG. 6 is a schematic view showing the general arrangement of a first preferred embodiment of a film strip feeding apparatus according to the present invention.

Referring to FIG. 6, the film strip feeding apparatus embodying the present invention is, more specifically, adapted to strip a leading end portion of the microfilm strip 38 from the roll of film 40 encased within the cartridge and feed the leading end portion of the microfilm strip 38 out of the film storage cartridge 36 through the film outlet/inlet opening 70 of the cartridge 36. The film strip feeding apparatus comprises, in addition to the film guide member 74, a rockable member 80 which is rotatably mounted on a pivot shaft 82 fixed in the microfilm reader and parallel with the axis of rotation H of the film-carrying reel 32 in the cartridge 36. The rockable member 80 is thus rockable with respect to the film storage cartridge 36 about an axis fixed in the microfilm reader and parallel with the axis of rotation H of the reel 32 in the cartridge 36. On this rockable member 80 are carried the previously mentioned stripping roller 42 and a series of rollers 84, 86, 88, 90 and 92 as shown.

The stripping roller 42 is engageable with the roll of film 40 in the film storage cartridge 36 and is operative to strip a leading end portion of the microfilm strip 38 from the roll of film 40 when the film-carrying reel 32 in the cartridge 36 is driven for rotation in the direction of arrow a to feed the microfilm strip 38 out of the cartridge 36. The stripping roller 42 is preferably constructed of hard rubber and is provided with teeth which form a ratchet wheel. The roller 84 is located in proximity to this stripping roller 42 on the rockable member 80 and acts as a pressing roller to be brought into and out of pressing engagement with the roll of film 40 in the film storage cartridge 36. The rollers 86 and 88 are drive rollers jointly coupled to suitable drive means (not shown) operative to drive the rollers 86 and 88 for concurrent rotation about an axis parallel with the pivot shaft 82. In the embodiment herein shown, the drive means coupled to the feed roller 44 forming part of the microfilm feed arrangement illustrated in FIG. 3 is used also as the drive means for the drive rollers 86 and 88 on the rockable member 80.

The rollers 90 and 92 act as idler rollers which, in combination with the drive roller 86, a first belt and roller arrangement which further comprises an endless drive belt 94 passed on the drive roller 88 and the rollers 90 and 92. The drive belt 94 is further passed on a drive shaft (not shown) of the stripping roller 42 so that, when the drive roller 86 is driven for rotation, the stripping roller 42 is driven for rotation about the center axis of the roller 42 in a direction indicated by arrow c. Between the drive roller 88 and pressing roller 84 is passed an endless drive belt 96 to form a second belt and roller arrangement on the rockable member 80 so that, when the drive roller 88 is driven for rotation, the pressing roller 84 is driven for rotation about the center axis of the roller 84 in a direction indicated by arrow d, viz., opposite to the direction of rotation c of the stripping roller 42.

The rockable member 80 thus carrying the first and second belt and roller arrangements in conjunction with the stripping and pressing rollers 42 and 84, respectively, is rockable about the center axis of the pivot shaft 82 between a first angular position indicated by full lines and a second angular position indicated by phantom lines. When the rockable member 80 is turned into the first angular position indicated by the full lines, the stripping and pressing rollers 42 and 84 thereon are located outside the film storage cartridge 36. When the rockable member 80 is turned into the second angular position indicated by the phantom lines, the stripping and pressing rollers 42 and 84 thereon are moved into the film storage cartridge 36 through the film outlet/inlet opening 70 of the cartridge 36 and are held in rollable contact with the roll of film 40 within the film storage cartridge 36. The stripping and pressing rollers 42 and 84 are located on the rockable member 80 such that, when the stripping and pressing rollers 42 and 84 are thus held in rollable contact with the roll of film 40, the pressing roller 84 is located posterior to the stripping roller 42 in the direction of rotation a of the film-carrying reel 32.

Though not shown in the drawings, the rockable member 80 is coupled to suitable biasing means effective to urge the rockable member 80 toward the first angular position thereof. The rockable member 80 is further coupled to suitable drive means such as a solenoid-operated actuator (not shown) which is operative to drive the rockable member 80 to turn into the second angular position thereof.

Before the microfilm reader having the film strip feeding apparatus constructed and arranged as hereinbefore described is put into operation, a film storage cartridge 36 containing a roll 40 of a microfilm strip 38 which the operator desires to view is assembled to the microfilm reader. When the film storage cartridge 36 is loaded into the microfilm reader, the film guide member 74 (FIG. 5) is inserted into the slot 76 in the casing 66 of the film storage cartridge 36. This is useful for enabling the operator to insert the cartridge 36 into a correct position within the microfilm reader. After the film storage cartridge 36 is thus loaded into the microfilm reader, the drive shaft 32a for the feed reel 32 is coupled to the reel 32. Thereafter, the drive means such as the pulsating current motor associated with the drive shaft 32a is actuated to drive the feed reel 32 for rotation at high speed in the direction of arrow a'. The feed reel 32 being thus driven for rotation in the direction of arrow a', the leading end portion of the microfilm strip 38 forming the roll of film 40 which may have been lengthwise slackened is properly tightened on the roll of film 40 and is thus conditioned to be capable of being stably unwound and withdrawn out of the cartridge 36.

The drive means associated with the drive shaft 32a is then actuated to drive the feed reel 32 for rotation at low speed in the direction of arrows a'. On the other hand, the drive means such as the solenoid-operated actuator associated with the rockable member 80 of the film strip feeding apparatus shown in FIG. 6 is activated to drive the rockable member 80 to turn from the first angular position to the second angular position thereof about the center axis of the pivot shaft 82. The rockable member 80 being thus turned into the second angular position thereof, the stripping and pressing rollers 42 and 84 thereon are moved into the film storage cartridge 36 through the film outlet/inlet opening 70 of the cartridge 36 and are brought into rolling contact with the roll of film 40 within the film storage cartridge 36. When the stripping and pressing rollers 42 and 84 are brought into rolling contact with the roll of film 40, the leading end portion of the microfilm strip 38 forming the roll of film 40 is further tightened on the roll of film 40.

In a predetermined period of time after the stripping and pressing rollers 42 and 84 are thus brought into rolling contact with the roll of film 40, the drive means associated with the drive shaft 32a is actuated to drive the feed reel 32 for rotation in the direction of arrow a. Simultaneously as the feed reel 32 is thus driven for rotation in the direction of arrow a, the drive means coupled to the feed roller 44 is actuated to drive the roller 44 for rotation clockwise in FIG. 3. The drive means is also associated with the drive rollers 86 and 88 forming part of the film strip feeding apparatus described with reference to FIG. 6 and, thus, the drive rollers 86 and 88 are now driven for concurrent rotation about the axis parallel with the pivot shaft 82. It may be herein noted that the pressing roller 84 is driven for rotation at a speed higher than the speed at which the film-carrying reel 32 in the film storage cartridge 36 is driven for rotation in the direction in which the microfilm strip 38 is to be unwound from the roll of film 40.

The drive roller 86 being driven for rotation, the stripping roller 42 is driven for rotation in the direction of arrow c by means of the first belt and roller arrangement including the endless drive belt 94. Furthermore, with the drive roller 86 driven for rotation, the pressing roller 84 is driven for rotation in the direction of arrow d opposite to the direction of rotation c of the stripping roller 42 by means of the second belt and roller arrangement including the idler rollers 90 and 92 and endless drive belt 96. As described previously, the stripping and pressing rollers 42 and 84 are arranged such that, when the rollers 42 and 84 are held in rollable contact with the roll of film 40, the pressing roller 84 is located posterior to the stripping roller 42 in the direction of rotation a of the film-carrying reel 32.

By virtue of such arrangement of the stripping and pressing rollers 42 and 84, the pressing roller 84 driven for rotation at a speed higher than the speed of rotation of the film-carrying reel 32 and held in rolling contact with the roll of film 40 tightens the outermost layer of the roll of film 40 while the leading end portion of the microfilm strip 38 is unwound from the roll of film 40 by means of the stripping roller 42 which is is located anterior to the pressing roller 84 in the direction of rotation a of the film-carrying reel 32.

While the film-carrying reel 32 is being driven for rotation and the leading end portion of the roll of film 40 thereon is being unwound from the roll 40, the outermost layer of the roll of film 40 is held in sliding contact with the conductive curved inner surface portion 78 of the film guide member 74. The electrostatic charges which may have been generated on the the outermost layer of the roll of film 40 are passed to ground through the surface portion 78 of the film guide member 74. Thus, if the roll of the microfilm strip 38 currently in use has a small diameter and in addition the leading end portion of the microfilm strip 38 extends straight from the roll of film 40, the leading end portion of the microfilm strip 38 can be unwound and withdrawn through the film outlet/inlet opening 70 of the film storage cartridge 36 smoothly and reliably without being hindered by the electrostatic charges which may otherwise be remaining on the leading end portion of the microfilm strip. Electrostatic charges tend to be generated on the roll of film 40 especially under low-temperature, high-humidity conditions and, for this reason, removing the charges from the roll of film 40 as above described is useful for the prevention of the jamming of the microfilm strip 38 under such ambient conditions.

Figure 7:
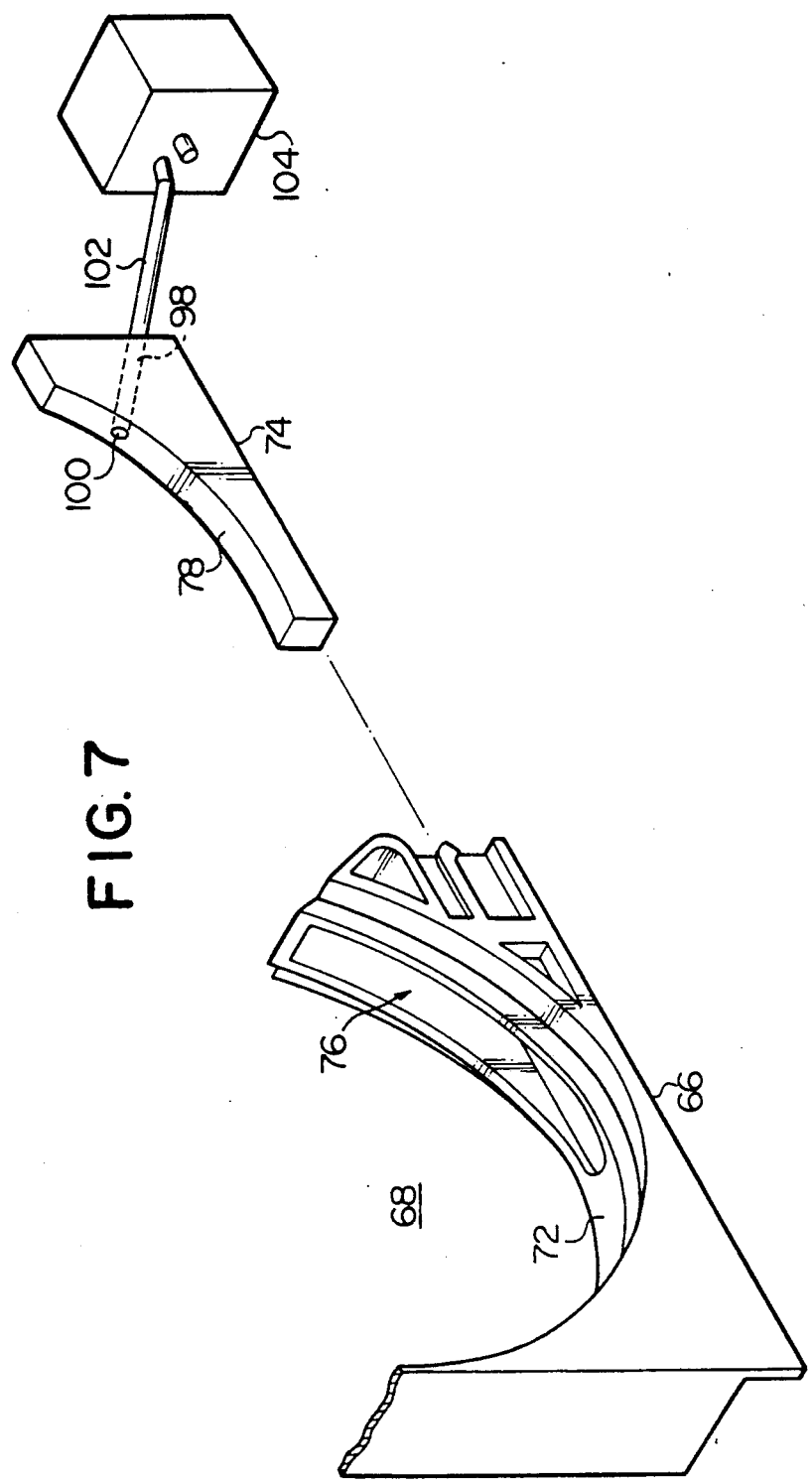
FIG. 7 is a perspective view similar to FIG. 5 but shows the combination of a rolled film storage cartridge and a modification of the film guide member in the arrangement illustrated in FIG. 5.

FIG. 7 is a view similar to FIG. 5 but shows the combination of the rolled film storage cartridge 36 and a modification of the film guide member 74 included in the arrangement hereinbefore described with reference to FIG. 5.

The film guide member 74 in the arrangement herein shown is characterized by the provision of an air blow-off passageway 98 having an outlet/inlet opening end 100 which is open at the conductive curved inner surface portion 78 of the guide member 74. The air blow-off passageway 98 communicates through a conduit 102 with a source of air under pressure such as typically an air compressor unit 104. When the film guide member 74 is received in the slot 76 in the rolled film storage cartridge 36 assembled into the microfilm reader, the outlet/inlet opening end 100 of the air blow-off passageway 98 is open into the circular central opening 68 in the casing 66 of the cartridge 36 preferably in a direction tangential to the central opening 68. When air under pressure is supplied from the compressor unit 104 and is injected into the casing 66 of the film storage cartridge 36, there is thus generated in the circular central opening 68 in the cartridge 36 a stream of air which swirls along the inner peripheral surface of the guide portion 72 of the casing 66 in a direction in which the film-carrying reel 32 is driven for rotation to have the microfilm strip 38 unwound from the roll of film 40 encased within the cartridge 36. The film guide member 74 thus arranged with the air blow-off passageway 98, conduit 102 and air compressor unit 104 forms part of the film strip feeding apparatus essentially similar to that which has been described with reference to FIG. 6.

When a film storage cartridge 36 containing a roll 40 of a microfilm strip 38 is assembled to the microfilm reader, the film guide member 74 is inserted into the slot 76 in the casing 66 of the film storage cartridge 36. After the cartridge 36 is thus loaded into the microfilm reader, the drive shaft 32a for the feed reel 32 is coupled to the reel 32 and the feed reel 32 is driven for rotation at high speed and thereafter at low speed in the direction of arrow a' so that the leading end portion of the microfilm strip 38 forming the roll of film 40 is tightened on the roll of film 40 as previously described. The rockable member 80 forming part of the film strip feeding apparatus is then driven to turn to the second angular position thereof so that the stripping and pressing rollers 42 and 84 are moved into rolling contact with the roll of film 40 within the film storage cartridge 36. With the stripping and pressing rollers 42 and 84 brought into rolling contact with the roll of film 40, the feed and take-up reels 32 and 34 are driven for rotation in the directions of arrows a and b, respectively, and the drive rollers 86 and 88 forming part of the film strip feeding apparatus are driven for concurrent rotation. The leading end portion of the microfilm strip 38 is thus unwound from the roll of film 40 by means of the stripping roller 42 driven for rotation in the direction of arrow c and the pressing roller 84 driven for rotation in the direction of arrow d tightens the outermost layer of the roll of film 40 as has been described with reference to FIG. 6.

Simultaneously when the film-carrying reel 32 is actuated to turn in the direction of arrow a and the leading end portion of the roll of film 40 thereon is being unwound from the roll 40, the air compressor unit 104 is put into operation to supply air under pressure into the air blow-off passageway 98 in the film guide member 74 through the conduit 102. The outlet/inlet opening end 100 of the air blow-off passageway 98 being open into the circular central opening 68 in the film storage cartridge 36 in a direction tangential to the central opening 68, the air under pressure supplied from the compressor unit 104 and injected into the central opening 68 in the casing 66 of the cartridge 36 generates between the inner peripheral surface of the guide portion 72 of the casing 66 and the outer peripheral surface of the roll of film 40 a stream of air which swirls around the outer peripheral surface of the roll of film 40 in the direction of rotation a of the film-carrying reel 32. If the microfilm strip 38 in use is extremely thin (with a thickness of the order of, for example, 1/1000 inch) and the roll of film 40 has a small diameter so that the leading end portion of the microfilm strip 38 being unwound from the roll of film 40 extends straight from the roll of film 40 or is curled in a direction opposite to the direction in which the microfilm strip 38 is to be withdrawn out of the cartridge 36, the leading end portion of the microfilm strip 38 is enabled to extend correctly along the inner peripheral surface of the guide portion 72 of the cartridge 36 and withdraw smoothly through the film outlet/inlet opening 70 of the cartridge 36 by the aid of the stream of air thus swirling around the roll of film 40.

It may be noted that the air compressor unit 104 is actuated after the roll of film 40 has been tightened with the film-carrying reel 32 driven for rotation in the direction of arrow a'. Thus, the air compressor unit 104 is put into operation to supply air under pressure into the film storage cartridge 36 simultaneously when the film-carrying reel 32 is actuated to turn in the direction of arrow a. The air compressor unit 104 is brought to a stop and the supply of air under pressure into the cartridge 36 is terminated when the leading end portion of the microfilm strip 38 unwound from the roll of film 40 and withdrawn out of the cartridge 36 reaches the encoder roller 48 in the microfilm feed arrangement illustrated in FIG. 3.

Figure 8:
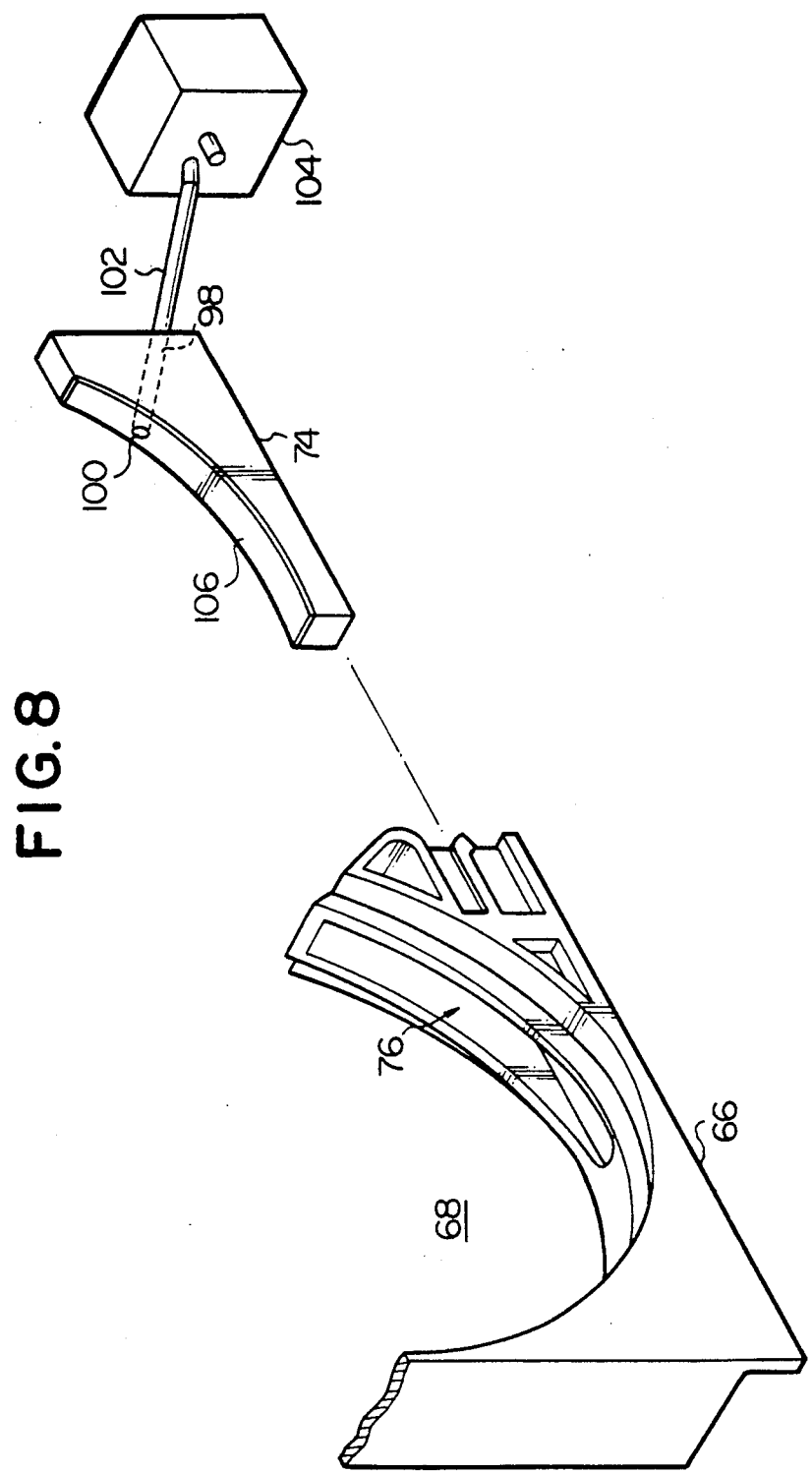
FIG. 8 is a view also similar to FIG. 5 but shows the combination of a rolled film storage cartridge and a modification of the film guide member in the arrangement illustrated in FIG. 7.

FIG. 8 is a view similar to FIG. 5 but shows the combination of the rolled film storage cartridge 36 and a modification of the film guide member 74 included in the arrangement hereinbefore described with reference to FIG. 7. While the film guide member 74 of the film strip feeding apparatus embodying the present invention has been assumed to be in its entirety made of metal, the microfilm strip guide member 74 herein shown is coated or covered with a film of metal 106 forming the curved inner surface portion 78 of the guide member 74. The conductive film of metal 106 thus forming part of such a film guide member 74 is grounded through a suitable conductor, though not shown in the drawings.

Figure 9:
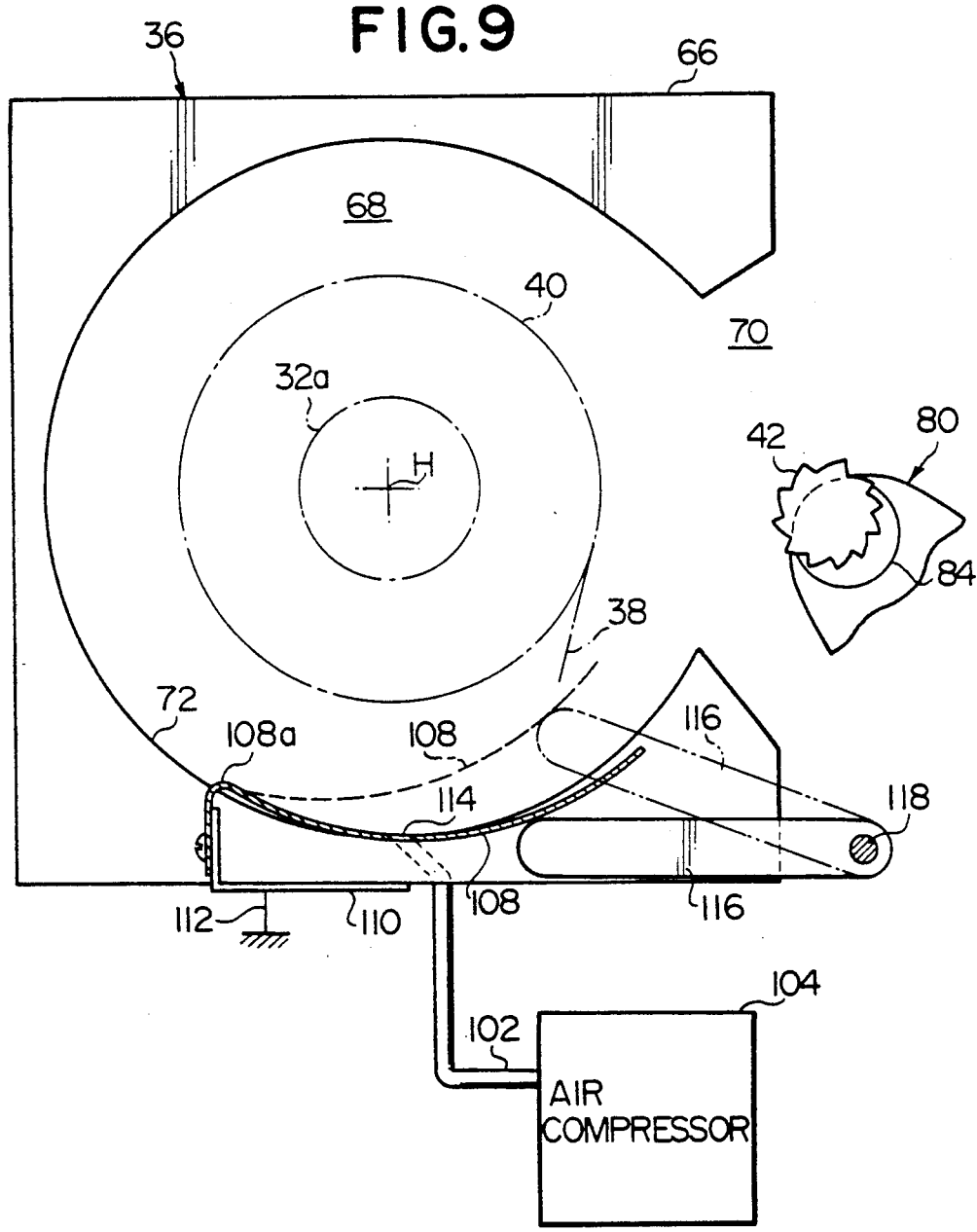
FIGS. 9 and 10 are schematic views showing the general construction and arrangement of another preferred embodiment of a film strip feeding apparatus according to the present invention.
Figure 10:
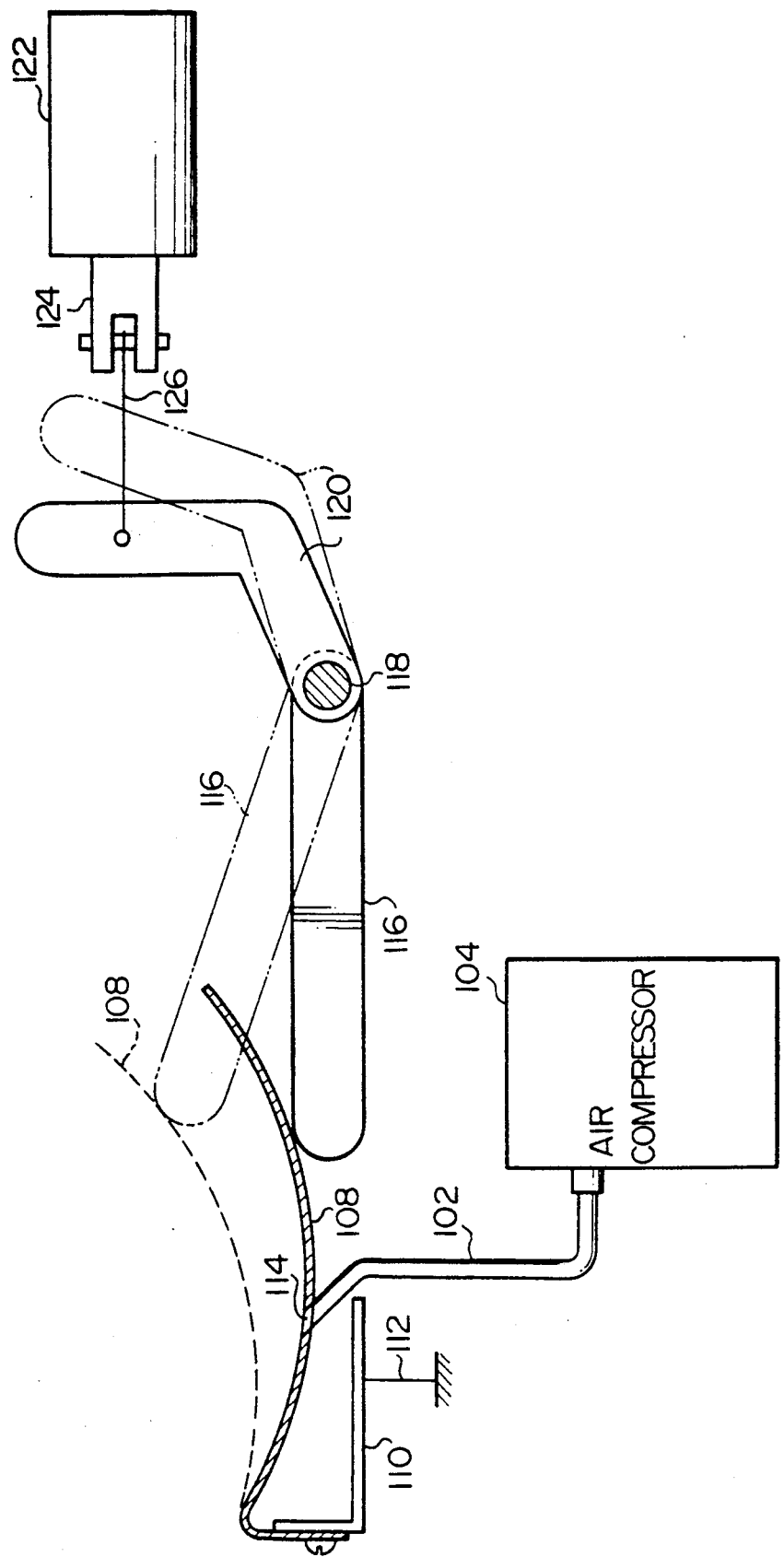

FIGS. 9 and 10 show another preferred embodiment of a film strip feeding apparatus according to the present invention.

In the embodiment of the invention herein shown, the microfilm strip guide member, now designated by reference numeral 108, is provided in the form of an arcuately curved leaf spring having one end portion securely held in position in the microfilm reader by means of a suitable bracket member 110. The film guide member 106 is grounded through a conductor 112 and has a free end opposite to its end portion secured to the bracket member 110.

The film guide member 108 is arcuately curved with a radius of curvature generally identical with that of the inner peripheral wall portion of the casing 66 forming the guide portion 72 of the cartridge 36. When the film storage cartridge 36 is assembled into the microfilm reader and is installed in a predetermined position within the microfilm reader, the film guide member 108 is received in the slot 76 in the cartridge 36. With the film guide member 108 thus received in the slot 76 in the cartridge 36, the guide member 108 has its curved inner surface portion located to be continuous to the guide portion 72 provided by an inner peripheral wall portion of the casing 66. The film-carrying reel 32 encased in the cartridge 36 is rotatably held in position in part by the inner peripheral surface of the guide portion 72 of the casing 66 and in part by the curved inner surface portion of the film guide member 108.

The film guide member 108 has provided therein an air blow-off opening 114 which is open to the circular central opening 68 in the casing 66 of the film storage cartridge 36 preferably in a direction tangential to the central opening 68. The air blow-off opening 114 communicates through a conduit 102 with a source of air under pressure such as typically an air compressor unit 104. When air under pressure is supplied from the compressor unit 104 and is injected into the casing 66 of the film storage cartridge 36, there is generated in the central opening 68 in the cartridge 36 a stream of air which swirls along the inner peripheral surface of the guide portion 72 of the casing 66 in a direction in which the film-carrying reel 32 is driven for rotation to have the microfilm strip 38 unwound from the roll of film 40.

The microfilm strip guide member 108 has its outer surface portion engaged by an elongated lever 116 which is connected at one end to a pivot element 118 rotatable in the microfilm reader about an axis parallel with the axis of rotation H of the film-carrying reel 32 and which has an opposite end portion held in slidable engagement with the outer surface portion of the microfilm strip guide member 108. The lever 116 is rockable between a first angular position having the film guide member 108 located to have its inner surface portion located to be continuous to the guide portion 72 provided by an inner peripheral wall portion of the casing 66 as indicated by full lines and a second angular position having the guide member 108 turned about its fixed end radially inwardly in the circular central opening 68 from the first angular position as indicated by broken lines.

As shown in FIG. 10, the lever 116 is securely connected to a link member 120 which is connected at one end to the pivot element 118 and which is thus rotatable with the lever 116 about the center axis of the pivot element 118. The link member 120 has an opposite end portion connected to or engaged by suitable drive means adapted to drive the link member 120 and lever 116 to turn about the center axis of the pivot element 118. In the arrangement shown in FIG. 10, such drive means comprises a solenoid-operated actuator unit 122 having a plunger 124 connected to the link member 120 by means of a connecting element 126 as shown.

The solenoid-operated actuator unit 122 has incorporated therein or engaged therewith suitable biasing means (not shown) urging the link member 120 and accordingly lever 118 to turn counterclockwise in FIG. 10 about the center axis of the pivot element 118. When the solenoid-operated actuator unit 122 remains de-energized, the lever 116 is thus held in the first angular position having the film guide member 108 located to have its inner surface portion located to be continuous to the guide portion 72 of the casing 66. On the other hand, when the solenoid-operated actuator unit 122 is energized, the plunger 124 of the actuator unit 122 is caused to axially retract and drives the link member 120 and accordingly the lever 116 to turn clockwise in FIG. 10 about the center axis of the pivot element 118. This causes the lever 108 to turn from the first angular position to the second angular position thereof and accordingly has the guide member 108 turned about its fixed end radially inwardly in the circular central opening 68 from the first angular position as indicated by broken lines in FIG. 10.

It may be noted that the fixed end portion of the film guide member 106 implemented by a leaf spring is shaped to slightly protrude radially into the circular central opening 68 in the casing 66 of the film storage cartridge 36 as indicated at 108a in FIG. 9. This is useful for precluding the leading end portion of the microfilm strip 38 from being hitched on the leading edge of the slot 76 in the film storage cartridge 36 when the leading end portion of the microfilm strip 38 is being unwound from the roll of film 40 in the cartridge 36.

Figure 11:
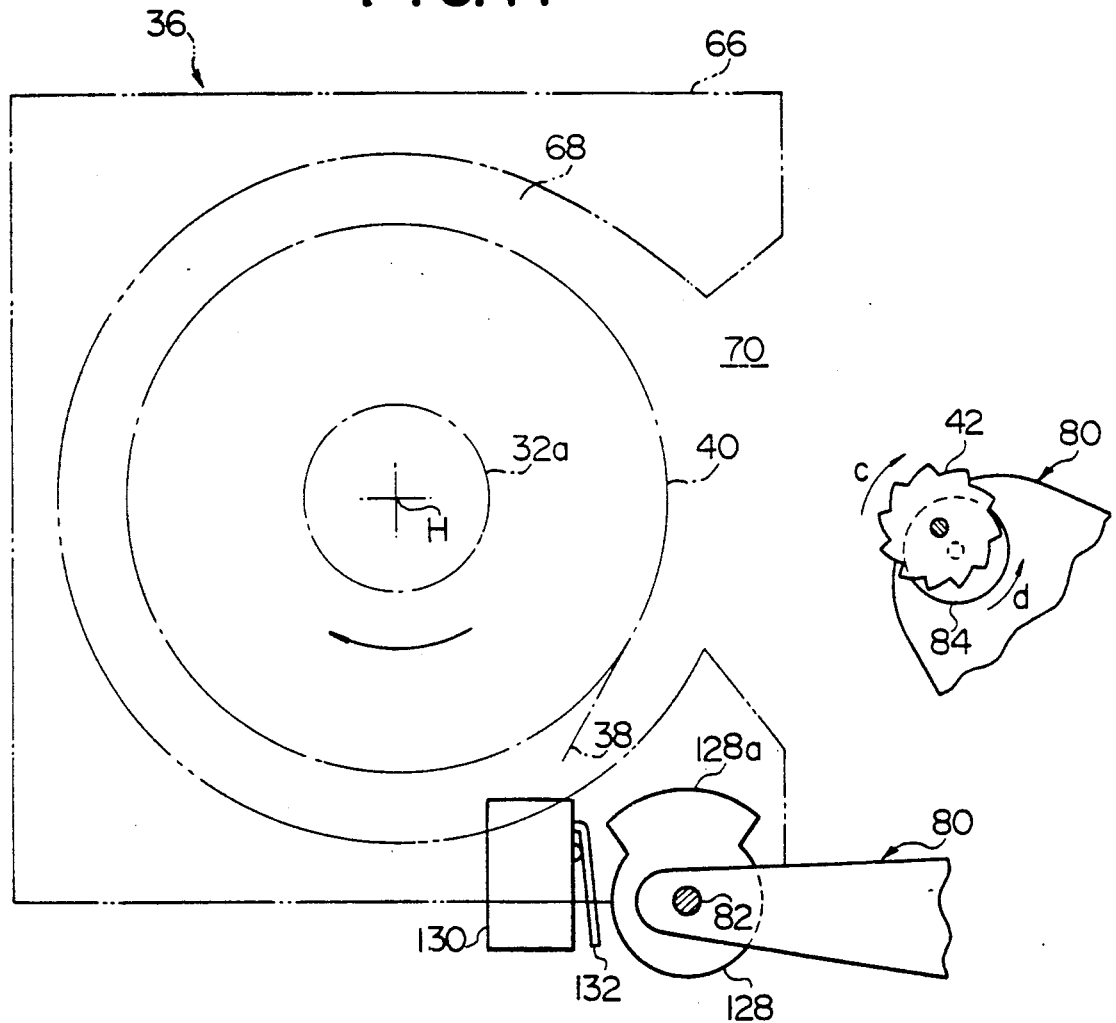
FIG. 11 is a schematic view showing the actuator control arrangement by means of which a solenoid-operated actuator unit included in the embodiment illustrated in FIGS. 9 and 10 is to be energized and de-energized.

The solenoid-operated actuator unit 122 is energized and de-energized responsive to the rocking motion of the rockable member 80 which forms part of the film strip feeding apparatus embodying the present invention. FIG. 11 shows the actuator control arrangement by means of which the solenoid-operated actuator unit 122 is thus energized and de-energized.

Referring to FIG. 11, such an actuator control arrangement comprises a cam member 128 rotatable on the pivot shaft 82 to which the rockable member 80 is pivotally connected as previously described with reference to FIG. 6. The cam member 128 is secured to the rockable member 80 and has a radially outwardly protruding cam lobe portion 128a arcuately curved about the center axis of the pivot shaft 82. In conjunction with this cam member 128 is provided a switch unit 130 having a movable contact element 132 implemented by a leaf spring located to be engageable with a suitable stationary contact element. Though not shown in the drawings, the stationary and movable contact elements of the switch unit 130 are electrically connected across a suitable power source and the solenoid-operated actuator unit 122.

When the rockable member 80 is driven to turn from the first angular position toward the second angular position thereof about the center axis of the pivot shaft 82 as previously discussed with reference to FIG. 6, the cam member 128 is also caused to turn counterclockwise in FIG. 11 about the center axis of the pivot shaft 82. When the cam member 128 is thus caused to turn through a predetermined angle about the center axis of the pivot shaft 82, the cam lobe portion 128a of the cam member 128 is brought into sliding and pressing contact with the movable contact element 132 of the switch unit 130. Accordingly, the movable contact element 132 of the switch unit 130 is forced to deform into contact with the stationary contact element so that a signal is produced and supplied to the solenoid-operated actuator unit 122. In response to the signal thus supplied through the switch unit 130, the solenoid-operated actuator unit 122 is energized and as a consequence the plunger 124 of the actuator unit 122 is caused to axially retract and drives the link member 120 and the lever 116 to turn clockwise in FIG. 10 about the center axis of the pivot element 118. The lever 116 is thus caused to turn from the first angular position to the second angular position thereof and accordingly has the guide member 108 turned about its fixed end radially inwardly in the circular central opening 68 from the first angular position as illustrated in FIG. 12.

As will be readily understood, the smaller the diameter of the roll of the microfilm strip 38, the larger the angle through which the rockable member 80 is required to turn from the first angular position to the second angular position thereof. Furthermore, the larger the angle of turn of the rockable member 80, the larger the angle of turn of the cam member 128. Thus, the actuator control arrangement hereinbefore described is useful in that, when the roll of the microfilm strip 38 having its leading end portion to be unwound from the film-carrying reel 32 and fed out of the cartridge 36 has a small diameter, the film guide member 108 is caused to turn about its fixed end radially inwardly in the circular central opening 68 and is thus enabled to reliably engage the leading end portion of the microfilm strip 38 being unwound from the film-carrying reel 32.

When the film storage cartridge 36 is assembled to the microfilm reader, the film guide member 108 is automatically inserted into the slot 76 in the casing 66 of the film storage cartridge 36. After the cartridge 36 is thus loaded into the microfilm reader, the feed reel 32 is driven for rotation at high speed and thereafter at low speed in the direction of arrow a' so that the leading end portion of the microfilm strip 38 forming the roll of film 40 is tightened on the roll of film 40. The rockable member 80 forming part of the film strip feeding apparatus is then driven to turn to the second angular position thereof so that the stripping and pressing rollers 42 and 84 are moved into rolling contact with the roll of film 40 within the film storage cartridge 36. With the stripping and pressing rollers 42 and 84 brought into rolling contact with the roll of film 40, the feed reel 32 is driven for rotation in the direction of arrow a, and the drive rollers 86 and 88 forming part of the film strip feeding apparatus are driven for concurrent rotation. The leading end portion of the microfilm strip 38 is thus unwound from the roll of film 40 by means of the stripping roller 42 driven for rotation in the direction of arrow c and the pressing roller 84 driven for rotation in the direction of arrow d tightens the outermost layer of the roll of film 40 as has been described with reference to FIG. 6.

Simultaneously when the film-carrying reel 32 is actuated to turn in the direction of arrow a and the leading end portion of the roll of film 40 thereon is being unwound from the roll 40, the air compressor unit 104 is put into operation to supply air under pressure into the air blow-off opening 114 in the film guide member 108 through the conduit 102. The air blow-off opening 114 being open into the circular central opening 68 in the film storage cartridge 36 in a direction tangential to the central opening 68, the air under pressure supplied from the compressor unit 104 and injected into the central opening 68 in the casing 66 of the cartridge 36 generates between the inner peripheral surface of the guide portion 72 of the casing 66 and the outer peripheral surface of the roll of film 40 a stream of air which swirls around the outer peripheral surface of the roll of film 40 in the direction of rotation a of the film-carrying reel 32. If the microfilm strip 38 in use is extremely thin (with a thickness of the order of, for example, 2.5 mils or about 2.5/1000 inches) and the roll of film 40 has a small diameter so that the leading end portion of the microfilm strip 38 being unwound from the roll of film 40 extends straight from the roll of film 40 or is curled in a direction opposite to the direction in which the microfilm strip 38 is to be withdrawn out of the cartridge 36, the leading end portion of the microfilm strip 38 is enabled to extend correctly along the inner peripheral surface of the guide portion 72 of the cartridge 36 and withdraw smoothly through the film outlet/inlet opening 70 of the cartridge 36 by the aid of the stream of air thus swirling around the roll of film 40.

In addition, if the roll of the microfilm strip 38 having its leading end portion to be unwound from the film-carrying reel 32 has a small diameter, the film guide member 108 is caused to turn about its fixed end inwardly in the circular central opening 68 and is thus enabled to reliably engage the leading end portion of the microfilm strip 38 being unwound from the film-carrying reel 32.

The microfilm strip guide member 108 is implemented by an electrically conductive leaf spring which is grounded through the conductor 112 (FIGS. 9 and 10) so that the electrostatic charges which may have been generated on the the outermost layer of the roll of film 40 are passed to ground through the film guide member 108. Thus, if the roll of the microfilm strip 38 in use has a small diameter and in addition the leading end portion of the microfilm strip 38 extends straight from the roll of film 40, the leading end portion of the microfilm strip 38 can be unwound and withdrawn through the film outlet/inlet opening 70 of the film storage cartridge 36 smoothly and reliably without being hindered by the electrostatic charges which may otherwise be remaining on the leading end portion of the microfilm strip. As has been noted, electrostatic charges tend to be generated on the roll of film 40 especially under low-temperature, high-humidity conditions and, for this reason, removing the charges from the roll of film 40 is useful for the prevention of the jamming of the microfilm strip 38 under such ambient conditions. The microfilm strip guide member 108 is preferably finished to have a sufficiently smooth inner surface so that there will be produced a minimum of frictional force between the inner surface of the guide member 108 and the microfilm strip 38 to slide on the guide member 108.

Each of the solenoid-operated actuator unit (not shown) as drive means for the rockable member 80, the solenoid-operated actuator unit 104 as the drive means for the lever 116, and the air compressor unit 104 is de-activated when the leading end portion of the microfilm strip 38 unwound from the roll of film 40 and withdrawn out of the cartridge 36 reaches the encoder roller 48 in the microfilm feed arrangement illustrated in FIG. 3. Thus, after the leading end portion of the microfilm strip 38 fed out of the cartridge 36 has reached the encoder roller 48, each of the rockable member 80 and lever 116 is turned back to the respective first angular position thereof so that the stripping and pressing rollers 42 and 84 are disengaged from the roll of film 40 on the film-carrying reel 32 and the microfilm strip guide member 108 is allowed to resume the initial position having its curved inner surface portion located to be continuous to the inner peripheral wall portion of the casing 66 as indicated by full lines in FIGS. 9 and 10.

In the embodiment of the present invention as has been hereinbefore described, the film guide member 108, lever 108, link member 120, and cam member 128 are designed and arranged so that, when the roll of film in use has a diameter less than, for example, 55 mm, the switch unit 130 is caused to close to move the guide member 108 inwardly to a position having its leading end located to be engageable with a roll of film having a diameter of, for example, 60 mm. This is useful for preventing the film guide member 108 from being brought into contact with the outermost layer of the roll of film 40 in the film-carrying reel 32 when the rocking member 80 is turned from the first angular position to the second angular position thereof.

While some preferred embodiments of a film strip feeding apparatus according to the present invention have thus far been described and shown, it should be borne in mind that such embodiments are simply for the purpose of illustration of the gist of the present invention and may be modified in numerous manners if desired. For example, the arrangement including the film guide member 108 and the rockable member 80 may be modified so that the microfilm strip guide member 108 is moved or deformed radially inwardly within the circular central opening 68 in the casing 66 of the film storage cartridge 36 continuously as the rockable member 80 is turned from the first angular position to the second angular position thereof. Alternatively, a suitable form of lug member may be provided which is driven to move continuously toward the outer peripheral surface of the roll of film in the cartridge 36 depending on the diameter of the roll of film in use. Furthermore, air under pressure may be injected into the cartridge 36 responsive to a signal produced through the switch unit 130 only when the roll of film in use has a diameter less than a predetermined value.

What is claimed is:

1. A film strip feeding apparatus for use with a film storage device detachably assembled into the film strip feeding apparatus and having an inner peripheral surface portion defining a generally circular central opening merging with a film outlet/inlet opening and having a roll of a film strip rotatably stored in the central opening, comprising:

stripping means for unwinding and stripping a leading end portion of the film strip from said roll of film and feeding the leading end portion of the film strip out of said film storage device through said film outlet/inlet opening, an electrically conductive member for making contact with said roll of film strip stored in the film storage device assembled into the film strip feeding apparatus in order to remove electrostatic charges from said film strip when the leading end portion of the film strip is unwound and stripped from said roll of film by said stripping means, and means for moving said electrically conductive member radially toward or away from the outer peripheral surface of said roll of film depending on the diameter of the roll of film.

2. A film strip feeding apparatus as set forth in claim 1, in which said electrically conductive member is formed with an opening, said film strip feeding apparatus further comprising air blow-off means for injecting air into said central opening through said opening in said electrically conductive member for producing a stream of air swirling along the inner peripheral surface of said film storage device in a direction in which the leading end portion of said film strip is unwound and stripped from said roll of film.

3. A film strip feeding apparatus for use with a film storage device detachably assembled into the film strip feeding apparatus and having an inner peripheral surface portion defining a generally circular central opening merging with a film outlet/inlet opening and having a roll of a film strip rotatably stored in the central opening, comprising a rockable member carrying a stripping roller engageable with the roll of film in said film storage device and operative to unwind and strip a leading end portion of the film strip from said roll of film and feeding the leading end portion of the film strip out of said film storage device through said film outlet/inlet opening, said rockable member being rockable about an axis fixed in the film strip feeding apparatus between a first angular position having said stripping roller disengaged from said roll of film and a second angular position having said stripping roller held in rollable engagement with said roll of film, a leaf spring of metal which is fixed at one end with respect to the film storage device assembled into the film strip feeding apparatus for removing electrostatic charges from the film strip, said leaf spring being arcuately curved inwardly in said circular opening in said film storage device and elastically deformable about the fixed end thereof radially within said circular central opening in said film storage device, a lever held in slidable engagement with said leaf spring and movable between a first position having said leaf spring located to have its surface portion substantially continuous to the inner peripheral surface portion of the film storage device and a second position having the leaf spring turned about its fixed end radially inwardly in the circular central opening of said film storage device from said first position, and drive means for driving said lever between said first and second positions thereof.

4. A film strip feeding apparatus as set forth in claim 3, in which said drive means for said lever comprises switch means including a movable contact element, and a cam member rotatable with said rockable member about said axis about which said rockable member is rockable, said cam member being driven to turn into engagement with said movable contact element of said switch means in response to angular movement of said rocking motion from said first angular position to said second angular position thereof.

5. A film strip feeding apparatus for use with a film cartridge detachably assembled into the film strip feeding apparatus comprising:

a movable member carrying stripping means engageable with a roll of film in said film cartridge and operative to unwind and strip a leading end portion of a film strip from said roll of film and feeding the leading end portion of the film strip out of said film cartridge, said movable member being movable depending on the diameter of the roll of film, charge removing means for removing electrostatic charges from said film strip in said cartridge by making contact with said film strip when the leading end portion of the film strip is unwound and stripped from said roll of film by said stripping means, and means for moving said charge removing means radially toward or away from the outer peripheral surface of said roll of film in accordance with the movement of said movable member, whereby said charge removing means, by virtue of being movable in accordance with the movement of said movable member, moves toward or away from the roll of film depending on the diameter of the roll of film.

6. A film strip feeding apparatus as set forth in claim 5, in which said charge removing means includes a leaf spring of metal which is fixed at one end with respect to the film cartridge assembled into the film strip feeding apparatus, is arcuately curved along the outer peripheral surface of the roll of film in the cartridge and is elastically deformable about the fixed end thereof radially.

7. A film strip feeding apparatus as set forth in claim 6, in which said leaf spring is formed with an opening, said film strip feeding apparatus further comprising air blow-off means for injecting air through said opening in said leaf spring for producing a stream of air swirling along the outer peripheral surface of said roll of film in a direction in which the leading end portion of said film strip is unwound and stripped by said stripping means.

8. A film strip feeding apparatus for feeding a leading end of a film strip from a roll of a film comprising:

stripping means for stripping the leading end of the film strip from the roll, a rockable member for supporting said stripping means, said rockable member swinging toward the roll until said stripping means makes contact with the outer peripheral surface of the roll when the leading end is stripped from the roll by said stripping means, a removing member for removing electrostatic charges from the film strip, and means for moving said removing member toward the outer peripheral surface of the roll in response to the angle of the swinging motion of the rockable member, whereby the position of said removing member in respect to the roll, by virtue of being movable in response to the angle of the swinging motion of said rockable member, depends on the diameter of the roll.

9. A film strip feeding apparatus as set forth in claim 8, in which said removing member is a leaf spring of metal which is fixed at one end with respect to the roll, is arcuately curved along the outer peripheral surface of the roll and is elastically deformable about the fixed end thereof radially.

* * * * *